(12) United States Patent
Bohn

(10) Patent No.: US 6,273,455 B1
(45) Date of Patent: Aug. 14, 2001

(54) AIR BAG AND AIR BAG ATTACHMENT

(75) Inventor: Stefan Bohn, Goldbach (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/389,148

(22) Filed: Sep. 2, 1999

(30) Foreign Application Priority Data

Sep. 4, 1998 (DE) .......................................... 298 15 936 U

(51) Int. Cl.⁷ .................................................. B60R 21/16
(52) U.S. Cl. .................... 280/728.2; 280/743.1; 280/728.3
(58) Field of Search .................... 280/728.1, 728.2, 280/731, 743.1, 728.3, 732

(56) References Cited

U.S. PATENT DOCUMENTS

| | | | |
|---|---|---|---|
| 5,074,584 | * 12/1991 | Jarboe | 280/731 |
| 5,542,692 | 8/1996 | Shaklik et al. . | |
| 5,584,508 | * 12/1996 | Maruyama et al. | 280/743.1 |
| 5,642,900 | * 7/1997 | Patel | 280/728.2 |
| 5,662,355 | * 9/1997 | Byon | 280/743.1 |
| 5,664,805 | * 9/1997 | Yoshida et al. | 280/743.1 |
| 5,709,401 | * 1/1998 | Schenck | 280/728.2 |
| 5,762,361 | * 6/1998 | Herrmann et al. | 280/728.2 |
| 5,836,612 | 11/1998 | Lang . | |
| 5,857,696 | * 1/1999 | Inoue et al. | 280/728.2 |
| 5,865,467 | * 2/1999 | Bito et al. | 280/743.1 |
| 5,931,491 | * 8/1999 | Bosgeiter et al. | 280/728.2 |
| 5,975,571 | * 11/1999 | Ford et al. | 280/743.1 |

FOREIGN PATENT DOCUMENTS 295 10 775 U  10/1995 (DE) .
298 04 611 U   7/1998 (DE) .
5-294202    * 11/1993 (JP) .

* cited by examiner

Primary Examiner—Lanna Mai
Assistant Examiner—Ruth Ilan
(74) Attorney, Agent, or Firm—Tarolli, Sundheim, Covell Tummino & Szabo L.L.P.

(57) ABSTRACT

A textile material blank is proposed for the manufacture of an air bag for air bag modules to be installed in vehicles as an impact protection device for vehicle occupants. The airbag module has an airbag carrier. The blank has one or more connecting flaps (1), either formed integrally with the blank (2) or attached to it, for the purpose of attaching the air bag to the airbag carrier.

6 Claims, 2 Drawing Sheets

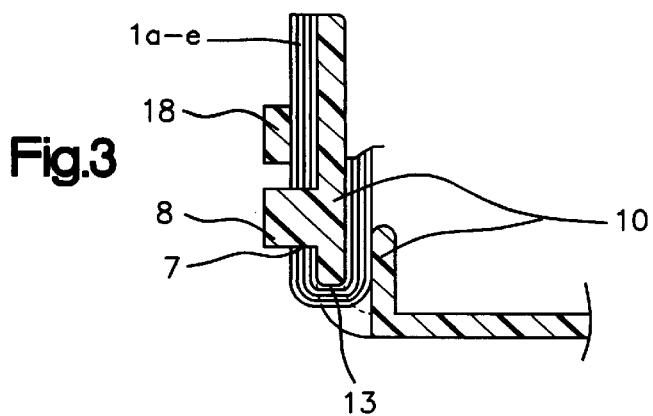
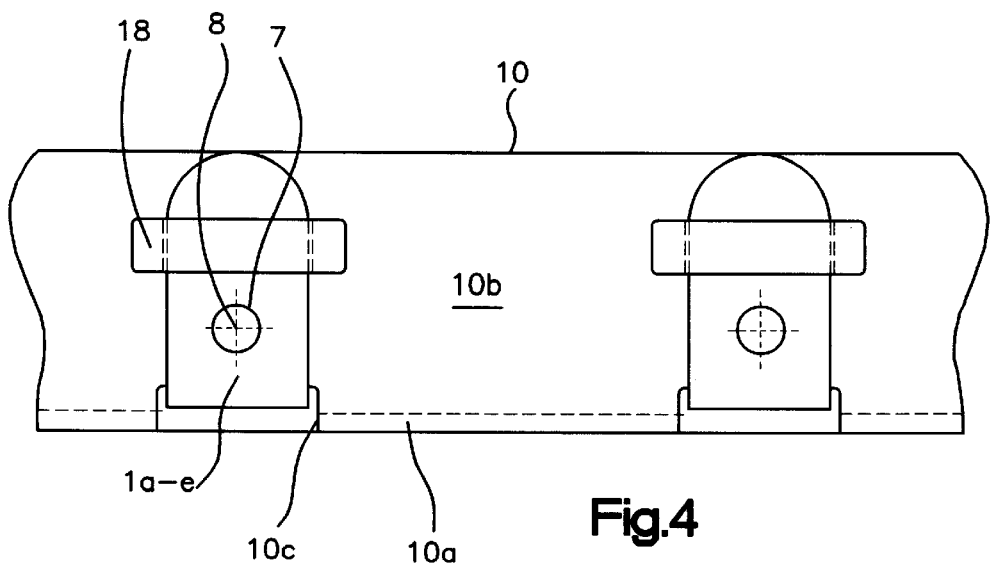
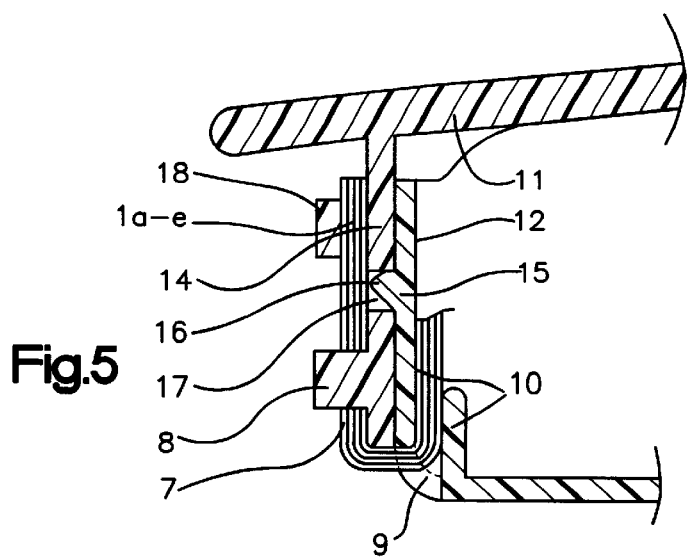

AIR BAG AND AIR BAG ATTACHMENT

The present invention relates to a textile material blank fox the manufacture of an air bag for air bag modules to be installed in vehicles as impact protection devices for vehicle occupants.

BACKGROUND OF THE INVENTION

Such impact protection devices serve as improvement of the passive safety of vehicles, air bag modules having been introduced as standard successively for the driver, where they are housed in the steering wheel, for the second front passenger, where they are housed in the instrument panel, as well as side air bags housed in the doors or seats, respectively and now form part of the basic equipment of almost all modern vehicles. For each vehicle there is a requirement for one to four or even more air bag modules so that the number of manufactured air bags exceeds by far the number of the corresponding vehicles produced. It is, therefore, understandable that efforts are being made to improve the air bag modules as regards manufacturing expenditure, weight, disposal, assembling expenditure etc.

For large scale manufacture of air bag modules, the air bag is usually made up of two circular material blanks which are joined to each other at their rims, one of them having a central intake throat for the inflation gases, the rim being normally clamped between an air bag holding plate and a carrier component of the air bag module. This way of air bag attachment has proved successful over time, but it is also relatively expensive. The air bag holding plate must be inserted through the intake throat and then fixed in relation to the intake throat within the air bag. It must have no sharp edges, to prevent the material from being torn in case the air bag is activated. Furthermore the clamping action around the inlet throat must be applied with a certain minimum force in all places to prevent the material from slipping out at some points in case the air bag is activated whereby is impaired the functionality of the air bag. In order to achieve a sufficiently strong clamping action, the clamping area must be of a certain width, whereby are implied limitations as to the installation and folding possibilities of the air bag.

SUMMARY OF THE INVENTION

The invention attempts to meet the requirement to overcome the aforementioned disadvantages of the air bag attachment method and to modify the material blanks for the manufacture of the air bag in such a way that there is no longer a need to rely on a conventional clamping connection, and that other means of attachment can be realized without increasing the manufacturing cost of the air bags as a consequence.

According to the invention, a material blank design of the type mentioned above is proposed which is characterized by at least one connecting flap, either formed integrally with the blank or attached to it, and provided for the purpose of attaching the air bag to an airbag carrier component.

The invention is based on the reasoning that the conventional clamping of the rim at the inlet throat may be dispensed with if the material blank is provided with one or more connecting flaps which may then be used to fix the air bag within the air bag module. Such connecting flaps may be formed as an integral part of the material blank for the manufacture of the air bag or they may be cut out separately and joined to the material blank for the air bag. For all that the tissue material which forms the air bag is consequently subjected to a stretching strain, whereby the required holding forces can be controlled substantial easier than in the case of a clamped joint which for safety reasons always has to be made oversize on account of inevitable manufacturing tolerances. In addition it also is constructionally easier to realize the air bag attachment by means of connecting flaps.

The invention also provides an air bag attachment which makes use of the inventive material blank to the invention.

BRIEF DESCRIPTION OF THE DRAWINGS

FIG. 3 shows an air bag attachment in section;

FIG. 4 shows the air bag attachment according to FIG. 3 as a developed projection, and FIG. 5 illustrates an air bag attachment which includes the cover plate.

DETAILED DESCRIPTION OF INVENTION

Figure 1:
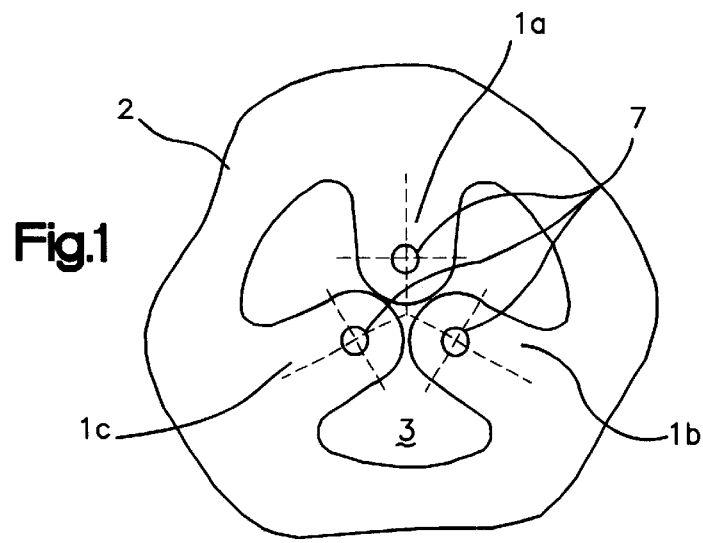
FIG. 1 shows a cutaway section of a material blank with a central inlet throat.

Referring to the cutaway section in FIG. 1 the material blank 2 with central inlet throat 3 shows three connecting flaps 1 radially extending inwards which consist of the material strips 1a, b, c and which are connected integrally with the rim of the inlet throat 3. In the eventuality that the size of the inlet throat 3 does not allow for the provision of sufficiently long connecting flaps 1, these can be extended by either sewn on or glued on material strips. The flaps 1a, b, c are provided with locating holes 7, the function of which will be explained further on.

Figure 2:
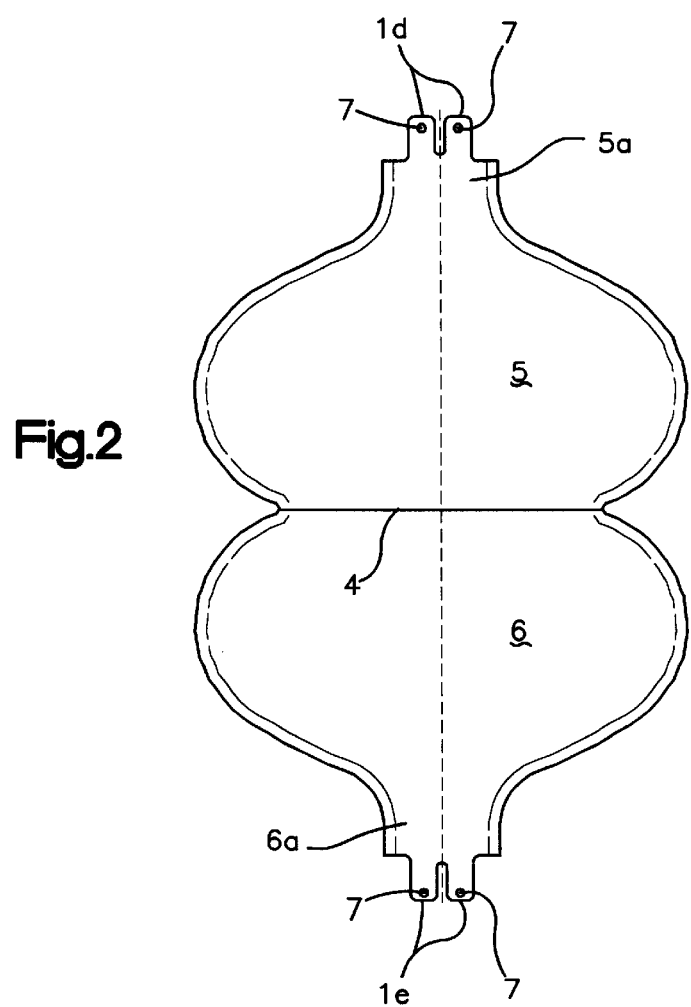
FIG. 2 shows a one-piece material blank with folding line.

FIG. 2 illustrates a material blank which consists of two main parts 5, 6, arranged symmetrically with respect to a folding line 4, which are provided with neck-shaped projection 5a, 6a, to each of which are connected integrally two flaps 1e and 1d. An air bag made from a blank according to this design will have a hose-shaped projection made up of parts 5a, 6a which is pushed over a tubular projection of the gas generator for the inflation of the air bag and clamped onto it by means of a hose clip or similar. It is, however, not necessary for a clamping attachment of this type to absorb the holding forces on activation of the air bag, because these can be transmitted to a carrier component via the flaps 1e, 1d, the locating holes 7 being pushed over pins or similar of the carrier component.

From FIG. 3 it becomes apparent how the flaps 1a to 1e may be folded around the rear or lower edge 13, respectively, of a carrier component 10. The ends provided with locating holes 7 are folded by 180° and fixed by means of their locating holes 7 to locating pins 8 provided on the outside of the carrier component 10 or similar. The width of the flaps can be adapted to the occurring holding forces, and the 180° fold ensures that part of the holding forces is absorbed by friction. The ends of the flaps can be pushed into pockets 18 which are formed at either the carrier component 10 or at the side wall area 14 of the cover plate 11.

FIG. 4 shows the air bag attachment according to FIG. 3 as a view on a developed area of the carrier component 10. The carrier component 10 can be embodied as a cup-shaped part with a bottom 10a and a side wall 10b, it being only necessary to ensure that the flaps 1a to 1e can be wrapped around the edge 13 and can be folded by 180° towards the front or upwards, respectively. In the embodiment shown, recesses 10c between the bottom 10a and the side wall 10b have been provided to this effect, through which recesses the flaps 1a to 1e may be lead through and fixed to the locating pins 8 with their ends provided with locating holes 7.

FIG. 5 illustrates a particularly advantageous air bag attachment, making use of the material blanks according to the invention, a cup-shaped carrier component 10 and a lid-type cover plate 11 being provided which have side wall areas 14, 15 which are concentric and in contact with each other when in their assembled state. Interacting lips 16 and recesses 17 in the side wall areas 14, 15 act together to make it possible to position the carrier component 10 and the cover plate 11 relative to each other. Both the lips 16 and the recesses 17 can furthermore be shaped in such a way as to form an additional form-locking clip union 12.

The flaps 1a to 1e of the material blank are lead through from top to bottom through a recess 9 of the carrier component 10, then folded upwards by 180° and then pined up on the locating pins 8, provided on the outside of the side wall 14 of the cover plate 11, by means of the locating holes 7. The reason why this type of air bag attachment is so advantageous is because the cover plate 11 can be attached at the same time, and because the flaps 1a to 1e, provided according to the Invention, not only replace the otherwise required means for the attachment of the air bag to the carrier component, but also the otherwise required means for the attachment of the cover plate 11 to the carrier component 10. This method of air bag attachment also offers a very favorable path of lines of force because the opening forces acting from the air bag on the cover plate 11 are directly diverted to the side wall areas 14 of the cover plate 11 on account of the 180°-folded flaps 1a to 1e, and will therefore be compensated. In other words, the explosive forces, acting in the opening direction, which are produced on activation of the air bag, are used to secure the cover plate 11 against the carrier component 10. No further securing means for the control of the holding forces are required. Here, too, it is of course possible to adapt the width of the flaps to the holding forces to be absorbed and, because of the 180° fold, part of the holding force is absorbed by friction.

What is claimed is:

1. An air bag attachment and an air bag to be installed in a vehicle as an impact protection device for a vehicle occupant, said air bag attachment having a cup-shaped air bag carrier and a lid-shaped cover plate, said cup-shaped air bag carrier and said lid-shaped cover plate, when assembled together, having side wall areas concentric to each other and in contact with each other, said air bag carrier having a plurality of slot-shaped through-openings, said air bag having three connecting flaps for attaching said air bag to said air bag carrier, said air bag having a central inlet throat, each of said three connecting flaps comprising a strip of material connected to a rim area of said inlet throat, each of said three connecting flaps having a locating hole, each of said three connecting flaps being folded by 180° around an edge of said air bag carrier, each of said three connecting flaps being passed through a respective through-opening from inside to outside of said carrier, said connecting flaps being folded against said side wall areas of said cover plate and said locating holes in said flaps receiving corresponding locating pins projecting outwardly from said cover plate side wall areas, said cover plate being secured to said carrier by said flaps.

2. An air bag attachment and an air bag according to claim 1, wherein said cover plate side wall areas and said air bag carrier side wall areas are positioned in relation to each other by interconnecting male and female configurations.

3. An air bag attachment and an air bag according to claim 1, wherein said carrier and said cover plate are interlocked with a snap fit.

4. An air bag attachment to be installed in vehicles as part of an impact protection device for vehicle occupants, said attachment comprising:

a cup shaped air bag carrier and a lid shaped cover plate which, when assembled, having side wall areas concentric to each other and in contact with each other, said air bag carrier having a plurality of slot-shaped through-openings, through which flaps of an air bag can be passed through from inside to outside of said carrier, said carrier having an edge around which the air bag can be wrapped and folded against said side wall areas of said cover plate, said cover plate side walls comprising locating pins projecting outwardly from said cover plate side wall areas for receipt in the locating holes in the flaps, said cover plate being attachable to said carrier by the flaps.

5. An air bag attachment according to claim 4, wherein said cover plate side wall areas and said air bag carrier side wall areas are positioned in relation to each other by interconnecting male and female configurations.

6. An air bag attachment according to claim 4, wherein said carrier and said cover plate are interlocked with a snap fit.

* * * * *